United States Patent [19]

Beckman et al.

[11] 3,873,890

[45] Mar. 25, 1975

[54] TERMINAL CONSTRUCTION FOR ELECTRICAL CIRCUIT DEVICE

[75] Inventors: Richard J. Beckman; John C. Blanchard, both of Milwaukee; Robert Marshall, Mequon; Orville R. Penrod, Muskego; Theodor von Alten, Grafton; Oscar Denes, Milwaukee, all of Wis.

[73] Assignee: Allen-Bradley Company, Milwaukee, Wis.

[22] Filed: Aug. 20, 1973

[21] Appl. No.: 389,765

[52] U.S. Cl. ............... 317/101 CC, 29/626, 29/630

[51] Int. Cl. ............................................ H05k 5/00

[58] Field of Search ................. 317/101 A, 101 CC; 338/312; 29/630 D, 626

[56] References Cited

UNITED STATES PATENTS 3,346,774 10/1967 Brady............................ 317/101 A

*Primary Examiner*—David Smith, Jr.
*Attorney, Agent, or Firm*—Arnold J. Ericsen

[57] ABSTRACT

An electrical circuit device having a ceramic substrate including a thick or thin film circuit on at least one surface thereof and an elongated groove formed in a surface substantially normal to the first mentioned surface. In one embodiment the elongated groove is divided into juxtaposed alternately distended and constricted portions, the constricted portions being adapted to receive an end portion of relatively flat lead wires. Prior to insertion of the lead wires, the respective constricted groove portions and the surface portion extending laterally therefrom are first metallized to define conducting areas leading to the respective lead wires. The lead wires are inserted and soldered in place.

9 Claims, 9 Drawing Figures

TERMINAL CONSTRUCTION FOR ELECTRICAL CIRCUIT DEVICE

BACKGROUND OF THE INVENTION

The invention relates to electrical circuit devices, and particularly to a method and means for anchoring and connecting lead wires to such devices.

In recent years there has been an increase in the usage of circuit devices wherein an electrical circuit is disposed upon a surface of a substrate which may be of a ceramic material such as alumina, steatite or other insulating materials. The devices are generally modular in nature and may comprise a complete electrical circuit on one or more of the substrate surfaces by means of thin film or thick film (cermet) techniques. The devices may include such arrangements, in addition to discrete components to provide hybrid circuits. Even though exotic techniques and circuits are employed on the surfaces, the circuits fundamentally depend upon integrity of electrical continuity through the termination and lead wires or members used to connect the device with other circuit components. Needless to say, there have been several techniques for terminating developed during the past few years, and each of them has been devised to provide electrical continuity and strength to achieve proper pull force at the connection between the lead wire and the termination of the circuitry. Also, the connection must be solid and stable so as to minimize any problems of electrical "noise."

Space is also a problem, particularly in the case of the so-called DIP (dual in-line packaging) devices where a device may contain aa many as 14 or 16 spaced lead wires closely positioned relative to one another.

Several means for connecting leads to circuit devices have been the subject of recent patents. Many devices have taken the form taught by the U.S. Pat. No. 2,989,655 issued to Khouri, wherein the leads are soldered directly to a conductive pad and the entire unit is encapsulated in a suitable electrically insulative material such as a plastic. Obviously, such construction, although satisfactory for most purposes, provides lead connections which lack suitable twisting and pull strength under certain environments. The U.S. Pat. No. 3,134,049 issued to Kilby is also somewhat similar of the connecting technique of the aforementioned Khouri patent. U.S. Pat. No. 3,029,495 granted to Doctor indicates yet another technique. Although the patent is not clear on its face, the lead wires are inserted in vertical notches with a conductive plastic used to hold the leads in place. This was brought forth in an article by the patentee in the August, 1958 issue of "Electrical Manufacturing" (pages 94–97). Vertical notches again are shown in the U.S. Pat. No. 3,492,536 granted to Di Girolamo, et al. However, in this case the notched portions are specifically configured to retain the leads.

An example of a technique which provides an interference fit, wherein the heads of the leads are retained in a cavity is shown in the Brady, et al., U.S. Pat. No. 3,280,378. In this case, insertion must be controlled to prevent any undue strain tending to rupture the ceramic substrate.

Also, most of the techniques used which provide desired characteristics, require individual insertion of leads in the substrate, whereas the present invention is intended for use with "lead frame" constructions wherein a plurality of leads is formed integrally with a common carrier portion for holding the leads until they have been inserted and retained in place. The carrier is then trimmed and cut away thereafter.

Further illustrations of lead attachment are shown in U.S. Pat. No. 2,877,389 granted to Wiener, U.S. Pat. No. 3,260,981 granted to Elliott, et al., and U.S. Pat. No. 3,281,923 granted to Best, et al.

SUMMARY OF THE INVENTION

The present invention contemplates a method and means for anchoring and connecting leads to an electrical circuit device wherein the circuit configurations are deposited on at least one surface of a ceramic substrate. The substrate is pressed or otherwise formed to include an elongated groove in at least one surface thereof. The groove is arranged to receive one end of at least one lead wire, and is particularly adapted for simultaneously receiving the ends of several lead wires attached to a lead frame. The ends of the lead wire or wires are retained in place without requiring jamming or interference fitting during the insertion thereof. Preferably, the groove is divided into juxtaposed alternately distended and constricted portions. In the preferred embodiment, the constricted portions are adapted to receive the ends of the leads with the adjacent distended or well portions acting as electrical spacing means and for collecting any debris during printing or soldering. The distended or well portions provide a convenient means for ease of removal of this debris.

In general, the ceramic substrate is pressed to the desired configuration, which may be in the form of a rectangular module, or may take the form of a module having a circular resistor and collector track printed thereon for use in variable resistors or potentiometers, such as the configuration shown in the U.S. Pat. No. 3,492,536 issued to Di Girolamo, et al. The substrate is then printed with a solderable composition such as silver paste, with the silver paste entering into the constricted portions of the groove and extending outwardly over the groove and overlapping the surface or surfaces supporting the printed electrical circuitry.

The electrical circuitry may be applied to one side or to both sides of the substrate as required. The circuit is applied after the edge termination is accomplished, and the device is then ready for insertion of the leads. In the case of thick film, or cermet, circuitry the substate is fired to desired temperature and cooled prior to insertion of the leads. The leads are preformed in the case of DIP units with an end portion bent for insertion into the constricted portions of the groove. Obviously, if the leads are positioned with the use of a lead frame construction, the leads are spaced on the lead frame to conform with the spacing of the constricted portions of the groove. The leads may be held in place in the unit and transported through a solder flow bath, where the solder will cling to the ends of the leads and to the printed silver paste areas. The solder does not adhere to other portions of the substrate or the circuit. The lead frame carrier portion is then trimmed away and the circuit may be adjusted in the usual fashion by means of a laser or other device. A conformal insulating coating is then deposited over the circuit and suitable identification is printed on the coating.

It will be apparent that among the several objects of the present invention, there is provided an electrical circuit device having lead wire terminations which are anchored and connected in place by means of a relatively large solder area determined by the preprinted edge termination area, and in which the leads are guided by a simplified lead frame technique and held in registration during soldering and trimming. The leads are not forced into place so as to cause a weakening of the ceramic structure. There is ample room between leads for electrical barrier insulation along with the accompanying provision of the distended groove portions for ease in cleaning between terminations. The secure attachment of the leads provides ample pull strength suitable for passing stringent user requirements.

The foregoing and other objects and advantages of the invention will appear from the following drawings which form a part hereof and which show by way of illustration a preferred embodiment of the invention. Such embodiment does not necessarily represent the full scope of the invention, and reference is made to the claims herein for interpreting the breadth of the invention.

DESCRIPTION OF THE PREFERRED EMBODIMENTS

Figures 1, 1A, 1B, 2, 3:
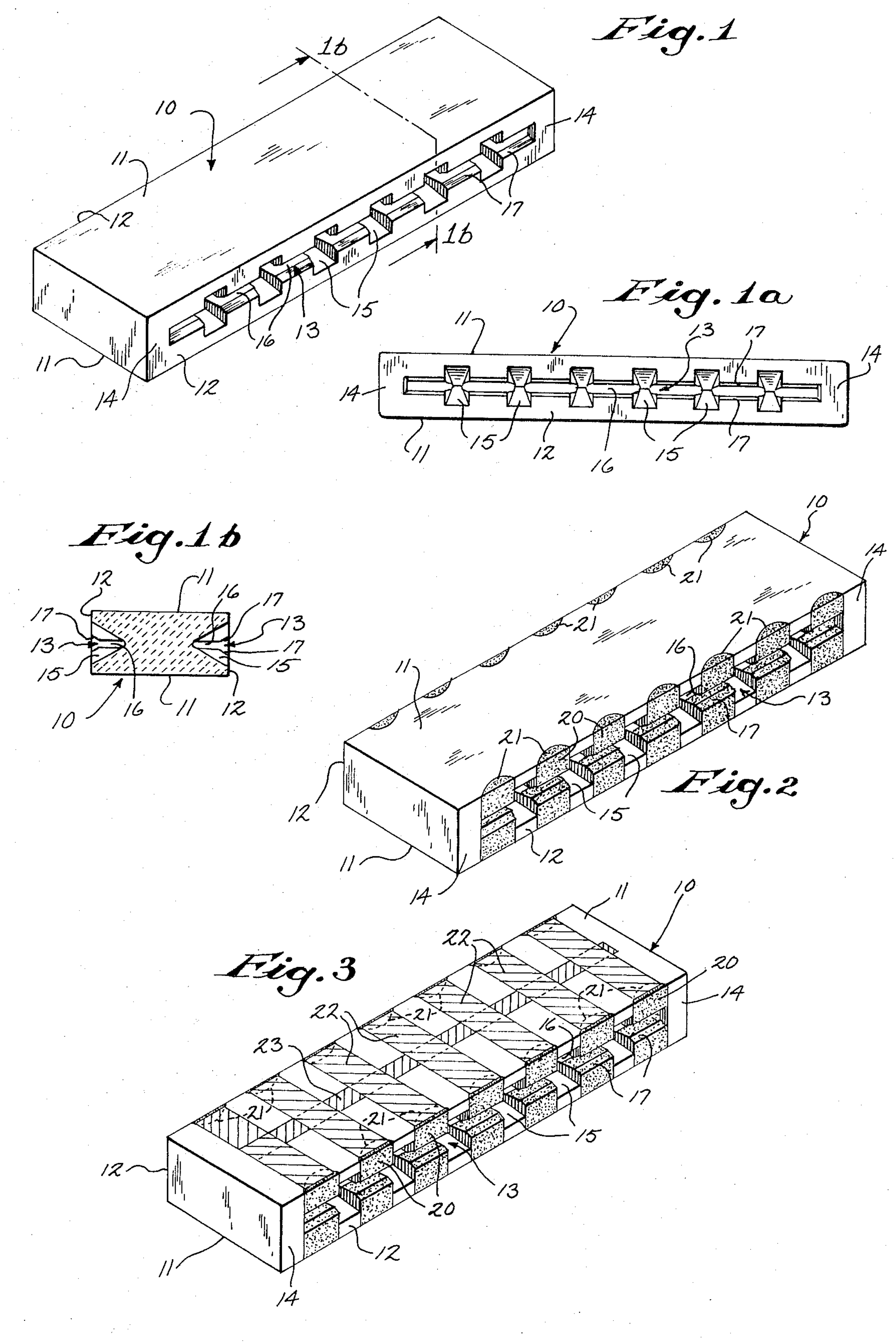
FIG. 1 is a perspective view of a DIP (dual in-line package) substrate suitable for use in the practice of the present invention.
FIG. 1*a* is a side view of the substrate of FIG. 1.
FIG. 1*b* is a view in cross-section of the substrate of FIG. 1 taken along the plane 1*b*—1*b*.
FIG. 2 is a perspective view of the substrate of FIG. 1 after printing of the edge termination configuration.
FIG. 3 is a perspective view, including the edge termination and a typical resistive network circuit deposited upon the upper surface of the substrate of FIG. 1.

The invention is best described in connection with the sequence of the various drawing figures, beginning with FIGS. 1, 1*a* and 1*b*. An insulating substrate 10 is pressed, or otherwise formed, from a ceramic material such as alumina or steatite to provide opposed upper and lower planar surfaces 11 and opposed planar edge surfaces 12. As will later be described, either one or both of the surfaces 11 will contain the electrical circuitry which may be in the form of a network of resistors, a combination of resistors and capacitors and semiconductor chips, or chips of capacitors, or the like. The circuit configuration is made in accordance with known techniques and does not form a particular part of the present invention.

The edges 12 extend angularly from the surfaces 11 and are preferably perpendicular therewith. The edges 12 are provided with a formed elongated groove, shown generally by the reference numeral 13. The groove 13 is shown substantially coextensive with the length of the substrate 10 and terminates in the oppositely disposed closed end portions 14 for added strength in construction and guiding during insertion of leads, as will later be discussed. However, it is conceivable that certain spacing requirements and the number of terminals might require that the groove extend the entire length (not shown). The groove 13 is defined further by juxtaposed alternately distended portions, or wells, 15 and constricted portions 16. The distended portions 15 (see FIG. 1*b*) are preferably tapered inwardly and the constricted portions 16 are preferably of rectangular cross-section, and are preferably chamfered at the surfaces 17. The preferred embodiment readily permits facile insertion of relatively flat leads 28 as will hereinafter be discussed.

Referring to FIG. 2, the substrate 10 is next provided with edge terminations areas 20 which are printed with a conducting material such as silver paste, and arranged to extend inwardly of the constricted portions 16 of the groove 13 and over the outer surface of the edge 12 to overlap as shown at 21 both the surfaces and upper and lower surfaces 11. This overlap area 21 connects the electrical circuitry to the edge of the substrate as will later be explained. The extensive area defined by the edge termination provides increased pull strength as well as continuity of circuitry to the leads. The termination material is printed on by means of a transfer roller or other known technique. The chosen material is also well-known and is compatible with solder for connecting the leads as will hereinafter be described. The silver paste edge termination is next fired on the substrate in the usual fashion.

In the present case, a resistive network is disclosed for purposes of illustrating a typical electrical circuit, although as previously mentioned, other well-known circuits may be utilized. In addition, the present construction utilizes a cermet resistor material which is also well-known, and may comprise a material such as that described in the Brandt, et al., U.S. Pat. No. 3,639,274, assigned to the same assignee as the present invention. The particular composition does not form a part of the present invention.

The resistive areas are denoted by the reference character 22, and are screen printed or otherwise deposited to extend over the overlapped portion 21 of the edge termination areas 20. Without going into the details of the circuitry, which is unimportant to the present invention, a conductive strip 23 of cermet material is laid down before the resistive layers in known fashion. This material is also of a glassy matrix including a highly conductive metallic material intermixed therewith. The layers may be fired individually or cofired as desired.

Figures 4, 4A:
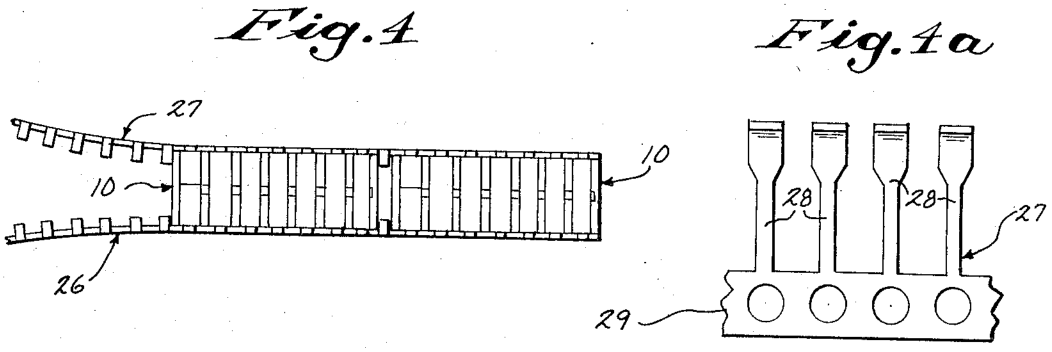
FIG. 4 is a top plan view of a typical lead frame assembly in the process of being brought into register with the substrates of FIG. 1.
FIG. 4*a* is a fragmentary side view of a section of the lead frame of FIG. 4.

Packages stated previously, the present embodiment illustrates a dual in-line package (DIP) which includes, in this case, 14 leads, although 16 lead padkages are not uncommon. One manner of assembling the leads to the substrates after firing of the electrical circuit components thereof is shown in FIG. 4. In this case two lead frames 26 and 27 are illustrated and include prebent L-shaped leads 28 (see also FIG. 4*a*) spaced relative to one another and integrally supported from a carrier portion 29. Referring again to FIGS. 1, 1*a* and 1*b*, it will be noted that the preferred embodiment provides the chamfered surfaces 17 on the constricted portion 16 and the closed end portions 14 each of which act to guide the leads into registry with the respective constricted portions 16. The lead thickness is preferably chosen to provide ease in insertion in the constricted portions 16. For example, the opening of portion 16 may be 0.015 inch, whereas the lead thickness may be 0.010 inch. Although not specifically shown, it will be understood that the leads 28 may contain a coating of solder prior to insertion, or that solder pellets may be inserted into the constricted portions 16 previous to insertion of the leads or that, as is often the case, the lead frames 26, 27 held in place the respective substrates 10, may be passed through a solder bath (not specifically shown) with the solder adhering to the leads 28 and to the printed silver paste edge termination areas 20 both inwardly of the groove and on the surface of the edge 12 (see FIG. 2). Since the electrical circuitry is printed to overlap the overlapped portions 21 of the edge termination and is of a glass base or ceramic material, the solder will not adhere to the upper or lower surfaces.

Figure 5:
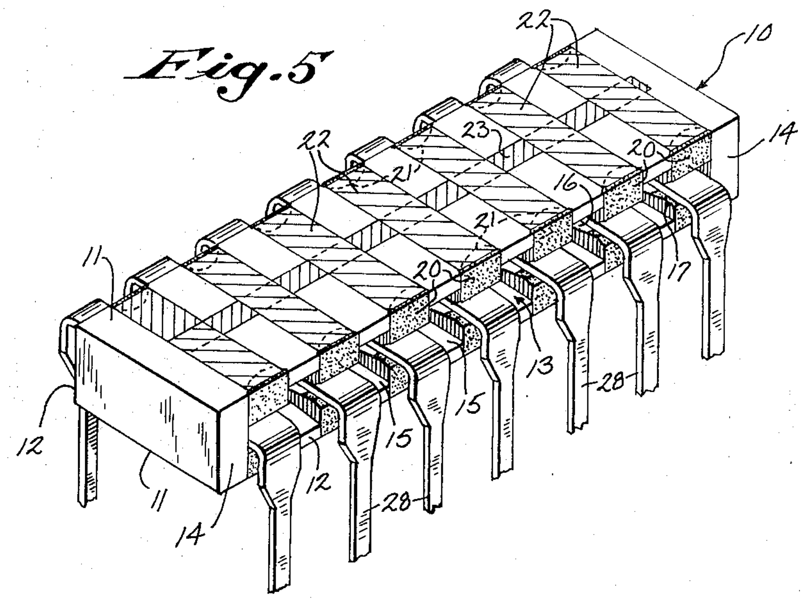
FIG. 5 is a perspective view illustrating the substrate and its circuit connection with leads soldered in place.
Figure 6:
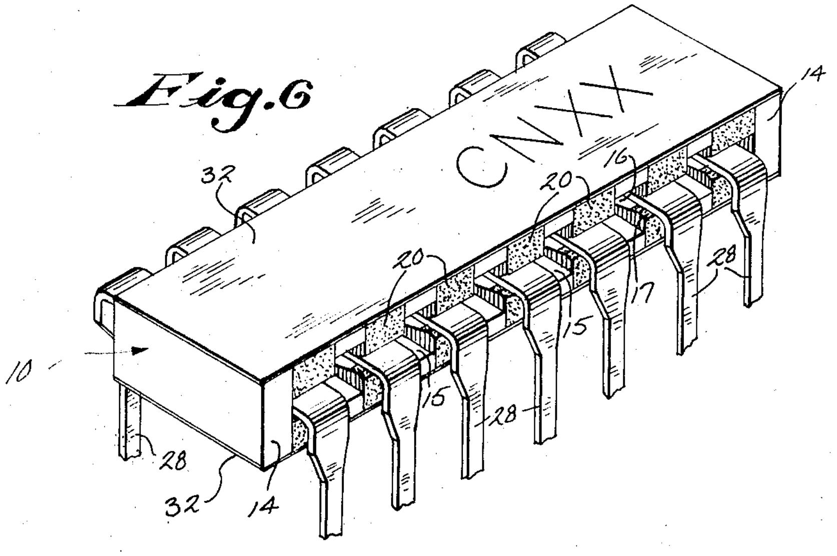
FIG. 6 is a perspective view of the finished product with conformal coating applied and identification printed thereon.

The carrier portion 29 of the lead frames is then cut off and the construction will appear as shown in FIG. 5. In the case of the resistive network, the resistors may be adjusted and trimmed by laser techniques or other techniques known in the art. After adjustment, a conformal coating 32 is applied to the upper and lower surfaces for protection of the circuitry from the elements. The coating may be color coded to identify the resistors if so desired. The coating may be one of many known filled plastic materials in the art and its composition does not form a part of the present invention. It is chosen to protect the circuitry and also to be of such composition so as not to interfere with the operation of the device. The usual identification characters 33 are printed on the opposed surface of the conformal coating 32 as will be observed from the illustration of FIG. 6.

It will be understood that the electrical circuit components, such as the resistive areas 22 may be printed on either or both of the top or bottom surfaces 11, and that the leads 28 may extend from only one side if usage so requires.

We claim:

1. In an electrical circuit device including a substrate of electrically insulating material having a first planar surface upon which is disposed electrical circuit components:

- a planar termination surface disposed in a plane angularly relative to said first mentioned circuit supporting surface, said termination surface defining a groove;
- a plurality of laterally spaced terminal leads each having an end portion seated in said groove;
- a plurality of laterally spaced continuous conducting edge termination coating areas each deposited transversely of said groove and underlying the end portion of one of said laterally spaced leads, each of said termination coating areas extending from its associated lead onto said first planar surface and in electrical contact with the electrical circuitry disposed thereon; and
- a solder coating on each of said edge termination coating areas and the end portion of its associated lead to retain and anchor said lead in place.

2. The electrical circuit device of claim 1, wherein the said groove includes juxtaposed distended and constricted portions, and wherein the respective end portions of said terminal leads are each seated in respective ones of said constricted portions.

3. The electrical circuit device of claim 1, wherein said groove is substantially coextensive with the planar termination surface to define closed, oppositely disposed end portions.

4. The electrical circuit device of claim 2, wherein the constricted portion of said groove is of rectangular cross-section and the terminal lead received thereby is of similar cross-section, and wherein the thickness of said lead is slightly less than that of said constricted portion.

5. The electrical circuit device of claim 1, wherein a conformal, non-conductive coating is disposed on said electrical circuit components.

6. A method for anchoring and connecting terminal leads to a substrate containing electrical circuit components on a surface thereof, comprising:

- forming a substrate having a circuit supporting, planar surface and a planar termination surface disposed in a plane angularly relative to said circuit supporting surface, and simultaneously forming an elongated groove extending lengthwise of said termination surface, said groove being formed with juxtaposed distended and constricted portions;
- applying and firing a continuous conducting coating disposed transversely of said termination surface inwardly of a groove portion and overlapping a portion of said circuit supporting surface;
- applying and firing a layer of electrical circuit components on said circuit supporting surface with connecting portions electrically connected to the said conducting coating;
- providing a plurality of spaced apart terminal leads formed integrally with and extending from a common carrier member;
- inserting one end of each of said terminal leads into respective constricted portions of said groove; and
- soldering said leads to the coated surface of said constricted portions of said groove and to the conducting coating surface of said termination surface; and
- removing said carrier member after the solder has been cooled and solidified.

7. In an electrical circuit device including a substrate of electrically insulating material having a first planar surface upon which is disposed electrical circuit components:

- A termination surface having a groove disposed therein and defining a plurality of juxtaposed alternately distended and constricted portions;
- a plurality of laterally spaced terminal leads each having an end portion seated in a constricted portion of said groove;
- a plurality of laterally spaced continuous conducting termination coating areas each area being deposited on said termination surface across a constricted portion of said groove and underlying the lead end portion seated therein;
- a solder coating on the termination coating and on the respective end portions of said leads to retain and anchor the leads in place.

8. The electrical circuit device of claim 7, wherein the opposite ends of said longitudinal groove are enclosed.

9. The electrical circuit device of claim 7, wherein said first planar surface is rectangular in shape to define a pair of opposing longitudinal edges, said termination surface intersects said first planar surface along at least one of said longitudinal edges and said termination coating areas each extends onto said first planar surface to make electrical contact with said electrical circuit components.

* * * * *